(12) United States Patent
Yu et al.

(10) Patent No.: US 11,267,325 B2
(45) Date of Patent: Mar. 8, 2022

(54) ENCAPSULATION ASSEMBLY FOR AUTOMOTIVE GLASS

(71) Applicant: FUYAO GLASS INDUSTRY GROUP CO., LTD., Fujian (CN)

(72) Inventors: Yusheng Yu, Fujian (CN); Min Wang, Fujian (CN); Zhuzhu Xu, Fujian (CN); Rongqiang Liu, Fujian (CN); Qingtuan Hu, Fujian (CN)

(73) Assignee: FUYAO GLASS INDUSTRY GROUP CO., LTD., Fuzhou (CN)

( * ) Notice: Subject to any disclaimer, the term of this patent is extended or adjusted under 35 U.S.C. 154(b) by 434 days.

(21) Appl. No.: 16/086,200

(22) PCT Filed: Feb. 28, 2018

(86) PCT No.: PCT/CN2018/077539
§ 371 (c)(1),
(2) Date: Sep. 18, 2018

(87) PCT Pub. No.: WO2018/166347
PCT Pub. Date: Sep. 20, 2018

(65) Prior Publication Data
US 2020/0298690 A1 Sep. 24, 2020

(30) Foreign Application Priority Data
Mar. 14, 2017 (CN) .......................... 201710148901.9

(51) Int. Cl.
*E05D 15/16* (2006.01)
*B60J 10/74* (2016.01)
(Continued)

(52) U.S. Cl.
CPC ......... *B60J 10/74* (2016.02); *B29C 45/14434* (2013.01); *B29L 2031/3052* (2013.01);
(Continued)

(58) Field of Classification Search
CPC . B60J 10/74; B60J 10/16; B60J 10/265; B60J 10/20; B60J 10/76; B60J 1/10; B29L 2031/3052; B29L 2031/778
(Continued)

(56) References Cited

U.S. PATENT DOCUMENTS 4,823,511 A * 4/1989 Herliczek ................ B60J 10/74
428/83
4,903,436 A * 2/1990 Rouillard ................ B60J 10/79
49/440
(Continued)

FOREIGN PATENT DOCUMENTS

CN 202241788 U 5/2012
CN 102529650 A 7/2012
(Continued)

OTHER PUBLICATIONS

International search report dated Apr. 27, 2018 from corresponding application No. PCT/CN2018/077539.
(Continued)

*Primary Examiner* — Jerry E Redman
(74) *Attorney, Agent, or Firm* — Hauptman Ham, LLP

(57) ABSTRACT

The present disclosure relates to an encapsulation assembly for automotive glass including first glass, an encapsulation component, a plastic guiding rail, a sealing strip, and a decorative layer. Second glass is slidably connected in the plastic guiding rail. One end of the plastic guiding rail is fixedly connected to an edge of the first glass by means of integrally injection-molding the encapsulation component. The other end of the plastic guiding rail is provided with a guiding groove for guiding sliding of the second glass. The guiding groove includes an upper wall and a lower wall opposite to each other. The sealing strip is fixed between the upper wall and the lower wall. The second glass and the sealing strip slidably cooperate. A side of the plastic guiding
(Continued)

rail facing outside of a vehicle is provided with the decorative layer by injection molding.

18 Claims, 3 Drawing Sheets

(51) Int. Cl.
    *B29C 45/14* (2006.01)
    *B60J 10/16* (2016.01)
    *B60J 10/265* (2016.01)
    *B29L 31/30* (2006.01)
    *B29L 31/00* (2006.01)

(52) U.S. Cl.
    CPC .......... *B29L 2031/778* (2013.01); *B60J 10/16* (2016.02); *B60J 10/265* (2016.02)

(58) Field of Classification Search
    USPC .................................. 49/440, 441; 296/146.9
    See application file for complete search history.

(56) References Cited

U.S. PATENT DOCUMENTS

| | | | | |
|---|---|---|---|---|
| 5,204,157 A * | 4/1993 | Matsumiya | ........... | B29C 70/202 428/105 |
| 5,846,463 A * | 12/1998 | Keeney | .................... | B60J 10/70 264/135 |
| 7,188,659 B2 * | 3/2007 | Hansen | .................... | B60J 1/208 160/273.1 |
| 7,210,729 B2 * | 5/2007 | Hammaker | ............. | B60J 10/72 296/146.15 |
| 7,650,719 B2 * | 1/2010 | Anders | .................... | B60J 10/40 49/489.1 |
| 7,854,094 B2 * | 12/2010 | Zimmer | .................. | B60J 10/50 49/440 |
| 8,042,303 B2 * | 10/2011 | Gandhi | .................... | B60J 10/76 49/441 |
| 8,690,234 B2 * | 4/2014 | Rockelmann | .......... | B60J 7/0015 296/214 |
| 9,920,566 B1 * | 3/2018 | Bennett | .................... | B60J 10/70 |
| 2001/0034976 A1 * | 11/2001 | Maass | .................... | B60J 10/78 49/441 |
| 2003/0168882 A1 * | 9/2003 | Naito | .................... | B60J 5/0402 296/146.2 |
| 2003/0205918 A1 * | 11/2003 | Carvalho | ................ | B60J 10/75 296/203.03 |
| 2004/0182010 A1 * | 9/2004 | Kalb | ........................ | B60J 10/76 49/441 |
| 2006/0103047 A1 * | 5/2006 | Zwolinski | ................ | B60J 10/70 264/174.11 |
| 2006/0156632 A1 * | 7/2006 | Ruppert | ............ | B29C 45/14377 49/502 |
| 2008/0238134 A1 * | 10/2008 | Guellec | ...................... | B60J 1/10 296/146.2 |
| 2008/0241470 A1 * | 10/2008 | Leclercq | ............... | B29C 31/041 428/122 |
| 2010/0001550 A1 * | 1/2010 | Janisch | .................... | B60J 10/78 296/146.2 |
| 2010/0095600 A1 * | 4/2010 | Gagnon | ................... | B60J 10/78 49/493.1 |
| 2010/0136348 A1 * | 6/2010 | Nakata | ................... | B60J 10/265 428/426 |
| 2011/0027574 A1 * | 2/2011 | Warren | ............. | C08G 59/4021 428/319.3 |
| 2012/0025554 A1 * | 2/2012 | Hasegawa | ............ | C09D 5/4465 296/1.08 |
| 2012/0144751 A1 * | 6/2012 | Schapitz | ................ | B60J 10/265 49/431 |
| 2012/0167473 A1 * | 7/2012 | Schapitz | ................ | B60J 10/16 49/431 |
| 2013/0160374 A1 * | 6/2013 | Kuwabara | ............. | B60J 10/40 49/440 |
| 2015/0017368 A1 * | 1/2015 | Kondou | ........... | B29C 45/14434 428/38 |
| 2015/0165884 A1 * | 6/2015 | Lee | ......................... | B60J 1/007 49/504 |
| 2017/0036519 A1 * | 2/2017 | Yamazaki | ................. | E06B 1/36 |
| 2017/0246779 A1 * | 8/2017 | Okuda | ............. | B29C 45/14418 |
| 2018/0119478 A1 * | 5/2018 | Lahnala | ................ | E06B 3/5454 |
| 2018/0119479 A1 * | 5/2018 | Jerrim | ............... | B32B 17/10302 |
| 2018/0134125 A1 * | 5/2018 | Takahashi | ................... | B60J 1/10 |
| 2019/0232769 A1 * | 8/2019 | Lorig | ....................... | B60J 10/40 |
| 2020/0290436 A1 * | 9/2020 | Takahashi | ............... | B60J 5/0402 |
| 2020/0298690 A1 * | 9/2020 | Yu | ............................. | B60J 10/20 |
| 2020/0338972 A1 * | 10/2020 | Zia | ........................ | B60J 10/18 |

FOREIGN PATENT DOCUMENTS

| | | |
|---|---|---|
| CN | 202810540 U | 3/2013 |
| CN | 203318113 U | 12/2013 |
| CN | 203331788 U | 12/2013 |
| CN | 203902215 U | 10/2014 |
| CN | 104943517 A | 9/2015 |
| CN | 204870475 U | 12/2015 |
| CN | 105291792 A | 2/2016 |
| CN | 105667416 A | 6/2016 |
| DE | 3631870 A1 | 3/1988 |
| DE | 19721566 A1 | 12/1997 |
| DE | 102007015466 A1 | 10/2008 |
| DE | 202010013082 U1 | 3/2012 |
| FR | 2858950 A1 | 2/2005 |
| JP | 2001071752 A | 3/2001 |

OTHER PUBLICATIONS

The First Office Action issued in corresponding DE Application No. DE 1120180000168, dated Apr. 7, 2021, pp. 1-5.

* cited by examiner

ENCAPSULATION ASSEMBLY FOR AUTOMOTIVE GLASS

RELATED APPLICATIONS

The present application is a National Phase of International Application Number PCT/CN2018/077539, filed Feb. 28, 2018, and claims the priority of China Application No. 201710148901.9, filed Mar. 14, 2017.

TECHNICAL FIELD

The present disclosure relates to a technical field of automotive glass, and in particular, to an encapsulation assembly for automotive glass.

BACKGROUND

A rear quarter window is a component quite widely used in modern vehicles, and has three main functions: (1) increasing light entering a vehicle and expanding a passenger's vision; (2) cooperating with other interior and exterior decorations to decorate the whole vehicle and improve its beauty; (3) cooperating with an oversized area in the rear of the vehicle to smoothly lift or lower rear window glass in case the oversized area may cause difficulty in lifting or lowering the rear window glass.

At present, there are two main types of rear quarter window: independent and integral.

The independent rear quarter window has a structure which is flexible, convenient to mount, and has a low cost. Such a structure of the rear quarter window may be mounted on a rear door or mounted on a vehicle body. However, when it is fitted to the rear door or the vehicle body, inaccuracy of fixing and positioning is likely to cause unfitness for peripheral components, large gaps, or mutual interference. In the integral rear quarter window, sealing material of the rear quarter window integrates rear quarter window glass with a guiding rail. Although this structure can effectively reduce the number of components, mounting and positioning prior integral rear quarter window is relatively complicated, which is disadvantageous to mounting and maintenance and is disadvantageous to improvement of manufacturing efficiency.

SUMMARY

The purpose of the present disclosure is to solve the technical problem in the prior encapsulation assembly for automotive glass, and provide an encapsulation assembly for automotive glass having high matching accuracy, low cost, fine appearance, and fine sealing effect.

The technical solution according to the present disclosure to solve the technical problem is an encapsulation assembly for automotive glass comprising first glass, an encapsulation component, a plastic guiding rail, a sealing strip, and a decorative layer. Second glass is slidably connected in the plastic guiding rail. One end of the plastic guiding rail is fixedly connected to an edge of the first glass by means of integrally injection-molding the encapsulation component. The other end of the plastic guiding rail is provided with a guiding groove for guiding sliding of the second glass. The guiding groove includes an upper wall and a lower wall opposite to each other. The sealing strip is fixed between the upper wall and the lower wall. The second glass and the sealing strip slidably cooperate. A side of the plastic guiding rail facing outside of a vehicle is provided with the decorative layer by injection molding. A gap between the decorative layer and the encapsulation component is greater than 0.5 mm.

Furthermore, the plastic guiding rail is made of ABS, ABS+GF, ABS+PC+GF, or PC+GF, and the decorative layer is made of PMMA.

Furthermore, the encapsulation component is made of TPE or PVC.

Furthermore, the decorative layer has a thickness of 1.5 mm to 3 mm.

Furthermore, the upper wall has a thickness of 1.5 mm to 3 mm, and the lower wall has a thickness of 1.5 mm to 3 mm.

Furthermore, the decorative layer covers an upper edge and a side edge of the upper wall, and a lower surface of the decorative layer covering the side edge of the upper wall is flush with a lower surface of the upper wall.

Furthermore, a lower edge and a side edge of the lower wall are covered by the encapsulation component, and an upper surface of the encapsulation component covering the side edge of the lower wall is flush with an upper surface of the lower wall.

Furthermore, a portion of the encapsulation component covering a side of the first glass facing the outside of the vehicle has a thickness of 1.5 mm to 3 mm.

Furthermore, another portion of the encapsulation component covering the lower edge of the lower wall has a thickness of 1.5 mm to 3 mm.

Furthermore, a lower surface of the upper wall is provided with an upper locking slot, an upper surface of the lower wall is provided with a lower locking slot, and the upper locking slot and the lower locking slot are used for snapping and fixing the sealing strip.

According to the present disclosure, the encapsulation component for automotive glass is formed by integrally injection molding, thereby reducing the number of fitting processes, precisely controlling the size tolerance of the opening of the guiding rail, improving the overall assembled effect of the sealing system of the rear door, and improving the appearance and sealing effect.

Furthermore, the glossy decorative layer is integrally injection-molded on the plastic guiding rail, thereby being capable of precisely controlling the matching tolerance of the glossy decorative layer and the size tolerance of the glossy decorative layer so as to solve the problem of water leakage and wind noise.

Reference list: 1, first glass; 2, encapsulation component; 21, upper surface of the encapsulation component; 3, plastic guiding rail; 4, decorative layer; 41, lower surface of the decorative layer; 5, guiding groove; 51, upper wall; 511, lower surface of the upper wall; 52, lower wall; 521, upper surface of the lower wall; 6, sealing strip; 7, second glass.

DETAILED DESCRIPTION

The present disclosure is further described hereinafter with reference to the accompanying drawings.

Figure 1:
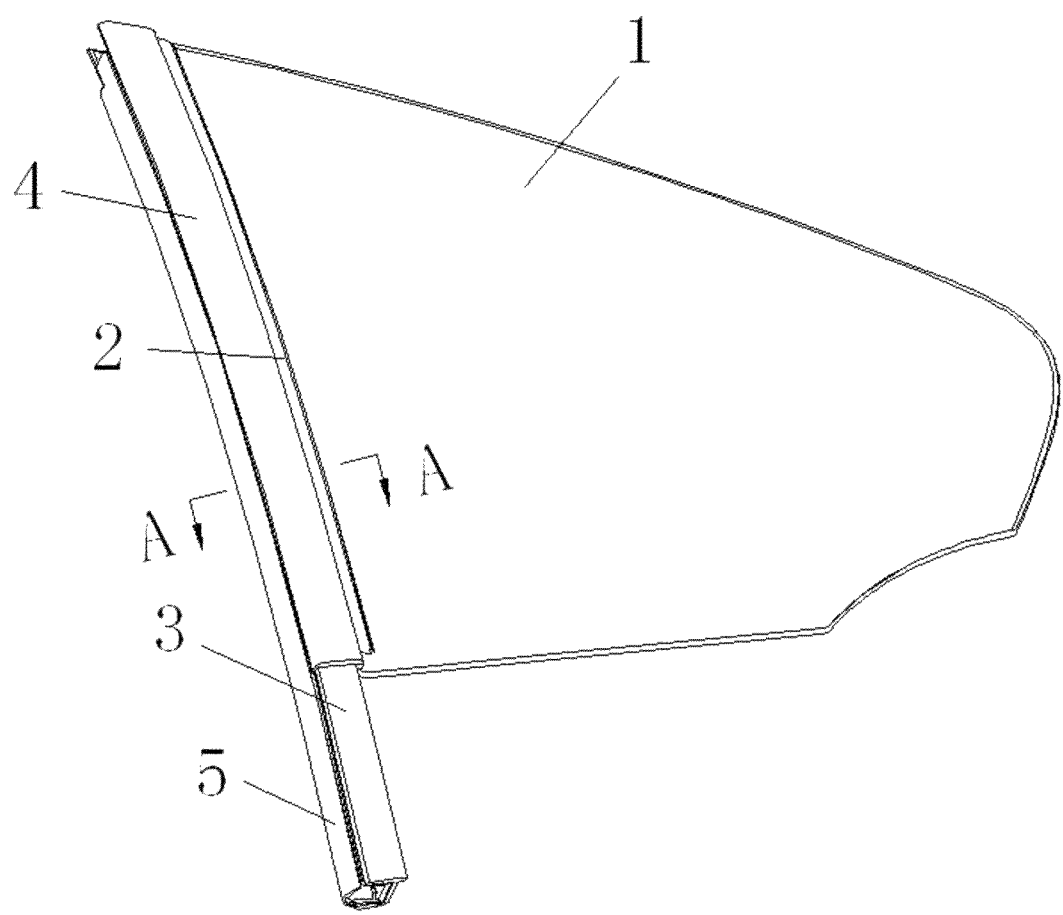
FIG. 1 is a schematic structural view of an encapsulation assembly for automotive glass according to the present disclosure.
Figure 2:
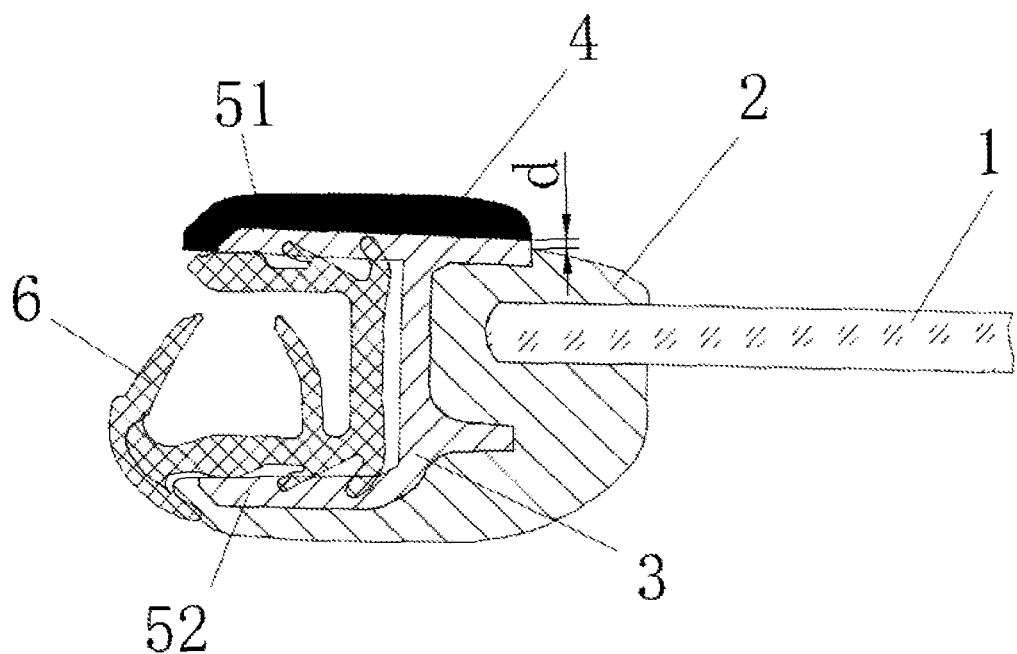
FIG. 2 is a cross-sectional view taken along a line A-A in FIG. 1.
Figure 3:
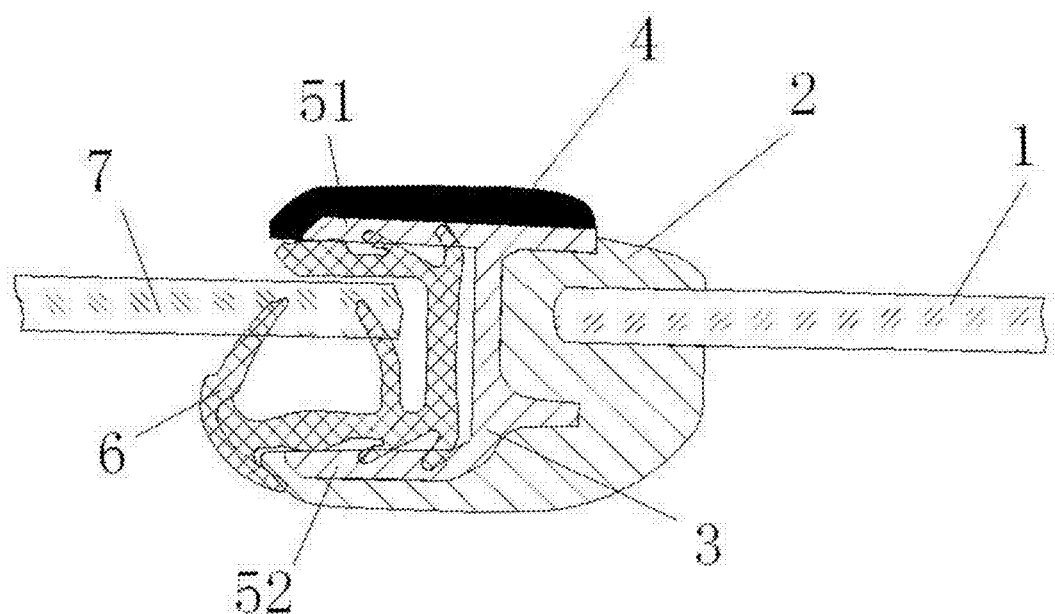
FIG. 3 is a schematic view of a cooperation structure of the encapsulation assembly for the automotive glass and second glass according to the present disclosure.
Figure 4:
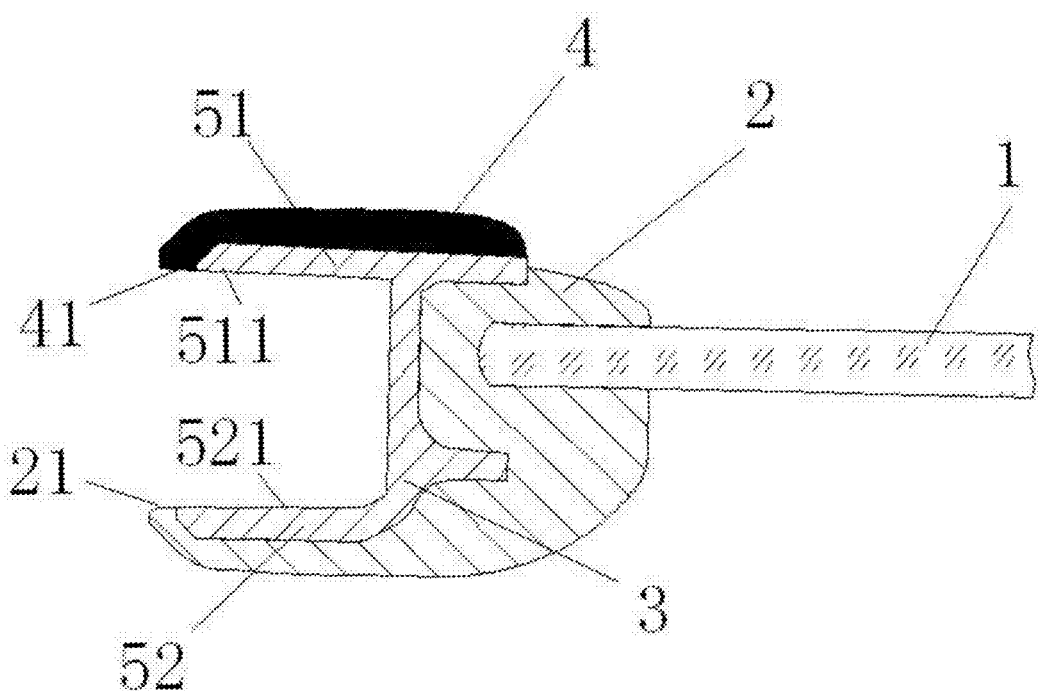
FIG. 4 is a schematic structural view of the encapsulation assembly for the automotive glass without a sealing strip according to the present disclosure.

As illustrated in FIGS. 1 to 4, an encapsulation assembly for automotive glass according to the present disclosure includes first glass 1, an encapsulation component 2, a plastic guiding rail 3, a sealing strip 6, and a decorative layer 4. Second glass 7 is slidably connected in the plastic guiding rail 3. One end of the plastic guiding rail 3 is fixedly connected to an edge of the first glass 1 by means of integrally injection-molding the encapsulation component 2. The other end of the plastic guiding rail 3 is provided with a guiding groove 5 for guiding the sliding of the second glass 7. The guiding groove 5 includes an upper wall 51 and a lower wall 52 opposite to each other, and the sealing strip 6 is fixed between the upper wall 51 and the lower wall 52. The second glass 7 and the sealing strip 6 slidably cooperate. A side of the plastic guiding rail 3 facing the outside of the vehicle is provided with the decorative layer 4 by injection molding. A gap between the decorative layer 4 and the encapsulation component 2 is greater than 0.5 mm, preferably between 0.8 mm and 1.5 mm.

In the present disclosure, the first glass 1 is a fixedly mounted rear quarter window, and the second glass 7 is a door window glass which can be lifted and lowered. The first glass 1 and the plastic guiding rail 3 are fixed connected to each other by means of integrally injection-molding the encapsulation component 2. The plastic guiding rail 3 has an H-shape positioned transversely. The encapsulation component 2 is made of injection molding materials commonly used for the encapsulation component for automotive glass, such as thermoplastic elastomer (TPE), polyvinyl chloride (PVC), and polypropylene (PP).

The prior encapsulation assembly for automotive glass has a structure of a split type. In the manufacturing procedure, there are not only molding processes for various components, but also bonding processes for various products. When the encapsulation assembly for automotive glass according to the present disclosure is formed, the decorative layer 4 may be first injection-molded on the plastic guiding rail 3, and then the plastic guiding rail 3 with the injection-molded decorative layer 4 is placed in an edging mold, and connected to the first glass 1 by means of integrally injection-molding the encapsulation component 2. Therefore, the structure according to the present disclosure can greatly simplify the product molding process and improve the manufacturing efficiency. Since the temperature for integrally injection-molding the encapsulation component 2 is higher than the melting point of the decorative layer 4, a gap is provided between the encapsulation component 2 and the decorative layer 4, in order to avoid the impact of the injection molding process on the decorative layer 4.

Furthermore, the decorative layer 4 is made of polymethyl methacrylate (PMMA), and the decorative layer 4 is made of high glossy PMMA material. The surface of the high glossy PMMA material can achieve the same decorative effect as a prior bright decorative strip. The plastic guiding rail 3 is made of ABS, ABS+GF, ABS+PC+GF, or PC+GF, which can meet the requirement of strength and can be firmly combined with the PMMA material.

ABS+GF refers to glass-fiber-reinforced ABS, and ABS refers to a copolymer of acrylonitrile (A), butadiene (B), and styrene (S). The ABS+GF is mainly used to improve heat resistance, rigidity, and strength of the material, and reduce size shrinkage and deformation of the material. In the present disclosure, the content of the glass fiber in the glass-fiber-reinforced ABS is generally between 10% and 30% by weight, preferably 30% by weight.

PC+GF refers to glass-fiber-reinforced PC, and PC refers to polycarbonate. The PC+GF is mainly used to improve heat resistance, rigidity, and strength of the material, and reduce size shrinkage and deformation of the material. In the present disclosure, the content of the glass fiber in the glass-fiber-reinforced PC is generally between 10% and 30% by weight, preferably 30% by weight.

ABS+PC+GF refers to glass-fiber-reinforced modified plastic which has better performance than pure PC and ABS, such as improved impact resistance, improved heat resistance, and increased hardness.

Furthermore, the decorative layer 4 has a thickness of 1.5 mm to 3 mm. The upper wall 51 has a thickness of 1.5 mm to 3 mm. The lower wall 52 has a thickness of 1.5 mm to 3 mm. A portion of the encapsulation component 2 covering a side of the first glass 1 facing the outside of the vehicle has a thickness of 1.5 mm to 3 mm. Another portion of the encapsulation component 2 covering the lower edge of the lower wall 52 has a thickness of 1.5 mm to 3 mm. The encapsulation component 2, the plastic guiding rail 3, and the decorative layer 4 of such thicknesses can meet the requirement of strength and the requirement of thickness for fitting, and can replace the prior independent structure.

Furthermore, the decorative layer 4 covers the upper edge and the side edge of the upper wall 51, and the lower surface 41 of the decorative layer covering the side edge of the upper wall 51 is flush with the lower surface 511 of the upper wall. The sealing strip 6 is snapped into the guiding groove 5 by means of subsequent fitting, and the flush structure is advantageous to the fitting, maintenance, and fixing of the sealing strip.

Furthermore, the lower edge and the side edge of the lower wall 52 are covered by the encapsulation component 2, and the upper surface 21 of the encapsulation component covering the side edge of the lower wall 52 is flush with the upper surface 521 of the lower wall. The sealing strip 6 is snapped into the guiding groove 5 by means of subsequent fitting, and the flush structure is advantageous to the fitting, maintenance, and fixing of the sealing strip.

Furthermore, the lower surface 511 of the upper wall is provided with an upper locking slot, and the upper surface 521 of the lower wall is provided with a lower locking slot. The upper locking slot and the lower locking slot are used for snapping and fixing the sealing strip 6.

The encapsulation assembly for automotive glass according to the present disclosure is described in detail hereinbefore. However, the present disclosure is not limited by the embodiments described above. Any improvements, equivalent modifications, and substitutions, etc., according to the spirit of the present disclosure, fall within the scope of the present disclosure.

What is claimed is:

1. An encapsulation assembly for automotive glass, comprising a first glass, an encapsulation component, a plastic guiding rail, a sealing strip, and a decorative layer, wherein a second glass is slidably connected in the plastic guiding rail, characterized in that, one end of the plastic guiding rail is fixedly connected to an edge of the first glass by means of integrally injection-molding the encapsulation component; an other end of the plastic guiding rail is provided with a guiding groove for guiding sliding of the second glass; the guiding groove includes an upper wall and a lower wall opposite to each other; the sealing strip is fixed between the upper wall and the lower wall; the second glass and the sealing strip slidably cooperate; a side of the plastic guiding rail facing outside of a vehicle is provided with the decorative layer by injection molding; and a gap between the decorative layer and the encapsulation component is greater than 0.5 mm; the decorative layer is merely in contact with the upper wall.

2. The encapsulation assembly for automotive glass according to claim 1, wherein the plastic guiding rail is made of copolymer of acrylonitrile, butadiene, and styrene (ABS), ABS+ glass fiber (GF), ABS+ polycarbonate (PC)+GF, or PC+GF, and the decorative layer is made of polymethyl methacrylate (PMMA).

3. The encapsulation assembly for automotive glass according to claim 1, wherein the encapsulation component is made of thermoplastic elastomer (TPE) or polyvinyl chloride (PVC).

4. The encapsulation assembly for automotive glass according to claim 1, wherein the decorative layer has a thickness of 1.5 mm to 3 mm.

5. The encapsulation assembly for automotive glass according to claim 1, wherein the upper wall has a thickness of 1.5 mm to 3 mm, and the lower wall has a thickness of 1.5 mm to 3 mm.

6. The encapsulation assembly for automotive glass according to claim 1, wherein the decorative layer covers an upper edge and a side edge of the upper wall, and a lower surface of the decorative layer covering the side edge of the upper wall is flush with a lower surface of the upper wall.

7. The encapsulation assembly for automotive glass according to claim 1, wherein a lower edge and a side edge of the lower wall are covered by the encapsulation component, and an upper surface of the encapsulation component covering the side edge of the lower wall is flush with an upper surface of the lower wall.

8. The encapsulation assembly for automotive glass according to claim 7, wherein a portion of the encapsulation component covering a side of the first glass facing outside of the vehicle has a thickness of 1.5 mm to 3 mm.

9. The encapsulation assembly for automotive glass according to claim 7, wherein another portion of the encapsulation component covering the lower edge of the lower wall has a thickness of 1.5 mm to 3 mm.

10. An encapsulation assembly for automotive glass, comprising a first glass, an encapsulation component, a plastic guiding rail, a sealing strip, and a decorative layer, wherein a second glass is slidably connected in the plastic guiding rail, characterized in that, one end of the plastic guiding rail is fixedly connected to an edge of the first glass by means of integrally injection-molding the encapsulation component; an other end of the plastic guiding rail is provided with a guiding groove for guiding sliding of the second glass; the guiding groove includes an upper wall and a lower wall opposite to each other; the sealing strip is fixed between the upper wall and the lower wall; the second glass and the sealing strip slidably cooperate; a side of the plastic guiding rail facing outside of a vehicle is provided with the decorative layer by injection molding; the decorative layer is in direct contact with an entire upper surface of the upper wall.

11. The encapsulation assembly for automotive glass according to claim 10, wherein the plastic guiding rail is made of copolymer of acrylonitrile, butadiene, and styrene (ABS), ABS+ glass fiber (GF), ABS+ polycarbonate (PC)+GF, or PC+GF, and the decorative layer is made of polymethyl methacrylate (PMMA).

12. The encapsulation assembly for automotive glass according to claim 10, wherein the encapsulation component is made of thermoplastic elastomer (TPE) or polyvinyl chloride (PVC).

13. The encapsulation assembly for automotive glass according to claim 10, wherein the decorative layer has a thickness of 1.5 mm to 3 mm.

14. The encapsulation assembly for automotive glass according to claim 10, wherein the upper wall has a thickness of 1.5 mm to 3 mm, and the lower wall has a thickness of 1.5 mm to 3 mm.

15. The encapsulation assembly for automotive glass according to claim 10, wherein the decorative layer covers an upper edge and a side edge of the upper wall, and a lower surface of the decorative layer covering the side edge of the upper wall is flush with a lower surface of the upper wall.

16. The encapsulation assembly for automotive glass according to claim 10, wherein a lower edge and a side edge of the lower wall are covered by the encapsulation component, and an upper surface of the encapsulation component covering the side edge of the lower wall is flush with an upper surface of the lower wall.

17. The encapsulation assembly for automotive glass according to claim 16, wherein a portion of the encapsulation component covering a side of the first glass facing outside of the vehicle has a thickness of 1.5 mm to 3 mm.

18. The encapsulation assembly for automotive glass according to claim 17, wherein another portion of the encapsulation component covering the lower edge of the lower wall has a thickness of 1.5 mm to 3 mm.

* * * * *